(12) United States Patent
Rinchiuso

(10) Patent No.: US 6,950,422 B2
(45) Date of Patent: Sep. 27, 2005

(54) INTERFERENCE REDUCTION WITHIN A COMMUNICATION SYSTEM

(75) Inventor: Joseph Rinchiuso, Elmhurst, IL (US)

(73) Assignee: Motorola, Inc., Schaumburg, IL (US)

( * ) Notice: Subject to any disclaimer, the term of this patent is extended or adjusted under 35 U.S.C. 154(b) by 827 days.

(21) Appl. No.: 09/812,873

(22) Filed: Mar. 19, 2001

(65) Prior Publication Data

US 2002/0131372 A1 Sep. 19, 2002

(51) Int. Cl.$^7$ .................................................. H04J 3/16
(52) U.S. Cl. ........................................ 370/346; 370/449
(58) Field of Search ............................... 370/346, 449, 370/348, 445, 461, 462, 347, 345, 458, 332; 379/92.01, 92.02; 340/3.51, 10.1–10.6, 825.08, 825.07; 714/708; 455/455, 62, 434, 63.1, 68, 69, 226.3, 226.2, 226.1, 226.4, 437

(56) References Cited

U.S. PATENT DOCUMENTS

| | | | | |
|---|---|---|---|---|
| 5,239,673 A | * | 8/1993 | Natarajan | 455/426.1 |
| 5,274,841 A | * | 12/1993 | Natarajan et al. | 370/337 |
| 5,485,464 A | * | 1/1996 | Strodtbeck et al. | 370/319 |
| 5,559,503 A | * | 9/1996 | Blahut | 340/825.52 |
| 6,078,568 A | * | 6/2000 | Wright et al. | 370/312 |
| 6,134,231 A | * | 10/2000 | Wright | 370/348 |
| 6,240,083 B1 | * | 5/2001 | Wright et al. | 370/348 |
| 6,445,917 B1 | * | 9/2002 | Bark et al. | 455/423 |
| 6,470,047 B1 | * | 10/2002 | Kleinerman et al. | 375/232 |
| 6,680,922 B1 | * | 1/2004 | Jorgensen | 370/328 |
| 6,704,291 B2 | * | 3/2004 | Mueckenheim et al. | 370/252 |
| 6,707,808 B1 | * | 3/2004 | Vedrine | 370/337 |
| 6,721,302 B1 | * | 4/2004 | Alastalo | 370/346 |
| 6,826,406 B1 | * | 11/2004 | Vialen et al. | 455/450 |
| 6,845,238 B1 | * | 1/2005 | Muller | 455/436 |
| 6,856,812 B1 | * | 2/2005 | Budka et al. | 455/522 |
| 2001/0026543 A1 | * | 10/2001 | Hwang et al. | 370/335 |
| 2001/0046220 A1 | * | 11/2001 | Koo et al. | 370/335 |
| 2001/0053140 A1 | * | 12/2001 | Choi et al. | 370/335 |

* cited by examiner

Primary Examiner—Wellington Chin
Assistant Examiner—Jamal A. Fox
(74) Attorney, Agent, or Firm—Kenneth A. Haas; Lalita W. Pace

(57) ABSTRACT

When polled, a remote unit (113) provides a radio access network (RAN 101) with an acknowledgment message. The acknowledgment message contains information such as the current window size, the number and identification of frames received in error, . . . etc. The polling frequency is based on a channel condition metric. More particularly, active polling timers that control the transmission of status information over the air interface are adjusted based on a bit error rate (BER) of radio channel such that as the BER of the radio channel decreases less control information is transmitted. Similarly as BER increases the timer values will change such that more control information is transmitted.

20 Claims, 5 Drawing Sheets

INTERFERENCE REDUCTION WITHIN A COMMUNICATION SYSTEM

FIELD OF THE INVENTION

The present invention relates generally to communication systems and in particular, to interference reduction within such communication systems.

BACKGROUND OF THE INVENTION

High-Speed data transmission for Wideband Code Division Multiple Access (WCDMA) communication systems will vary and is dependent on the channel/cell condition. In particular, the number of users, along with system interference serve to reduce data rates for data transmissions. Because system interference reduces data rates, it is beneficial to reduce the amount of transmission within the WCDMA system in order to increase data rates. Therefore, a need exists for a method and apparatus for interference reduction within a communication system in order to increase data rates.

DETAILED DESCRIPTION OF THE DRAWINGS

To address the need for reducing interference within a communication system, a method and apparatus for reducing system interference is provided herein. During data transmission, a remote unit provides a radio access network with an acknowledgment message when polled. In the preferred embodiment of the present invention the polling frequency is based on a channel condition metric. More particularly, active polling timers that control the transmission of status information over the air interface are adjusted based on a bit error rate (BER) of the radio channel such that as the BER of the radio channel decreases less control information is transmitted. Similarly as BER increases the timer values will change such that more control information is transmitted.

The present invention encompasses a method for reducing interference within a communication system. The method comprises the steps of polling a remote unit for status information at a first rate, determining a channel condition metric for an uplink channel, and polling the remote unit for status information at a second rate, wherein the second rate is based on the channel condition metric for the uplink channel.

The present invention additionally encompasses a method for reducing interference within a communication system. The method comprising the steps of transmitting data to a remote unit via a downlink channel, polling the remote unit for status information regarding the transmitted data, wherein the step of polling takes place at a first polling rate, and determining a channel condition metric for an uplink channel. The remote unit is then polled for the status information at a second rate, wherein the second rate is based on the channel condition metric for the uplink channel.

The present invention additionally encompasses a method comprising sending status information to a radio access network (RAN) at a first rate. determining a channel condition of a downlink communication channel, and sending status information to the RAN at a second rate based on the channel condition.

The present invention encompasses an apparatus comprising a control unit having a channel condition metric as an input and outputting a polling rate, a timer having the polling rate as an input and outputting a command at the polling rate, and transmission circuitry having the command as an input and outputting a polling message to a remote unit at the polling rate.

The present invention additionally encompasses an apparatus comprising a control unit having a channel condition metric as an input and outputting a transmit rate, a timer having the transmit rate as an input and outputting a command at the transmit rate, and transmission circuitry having the command as an input and outputting a status message to a radio access network (RAN) at the transmit rate.

Figure 1:
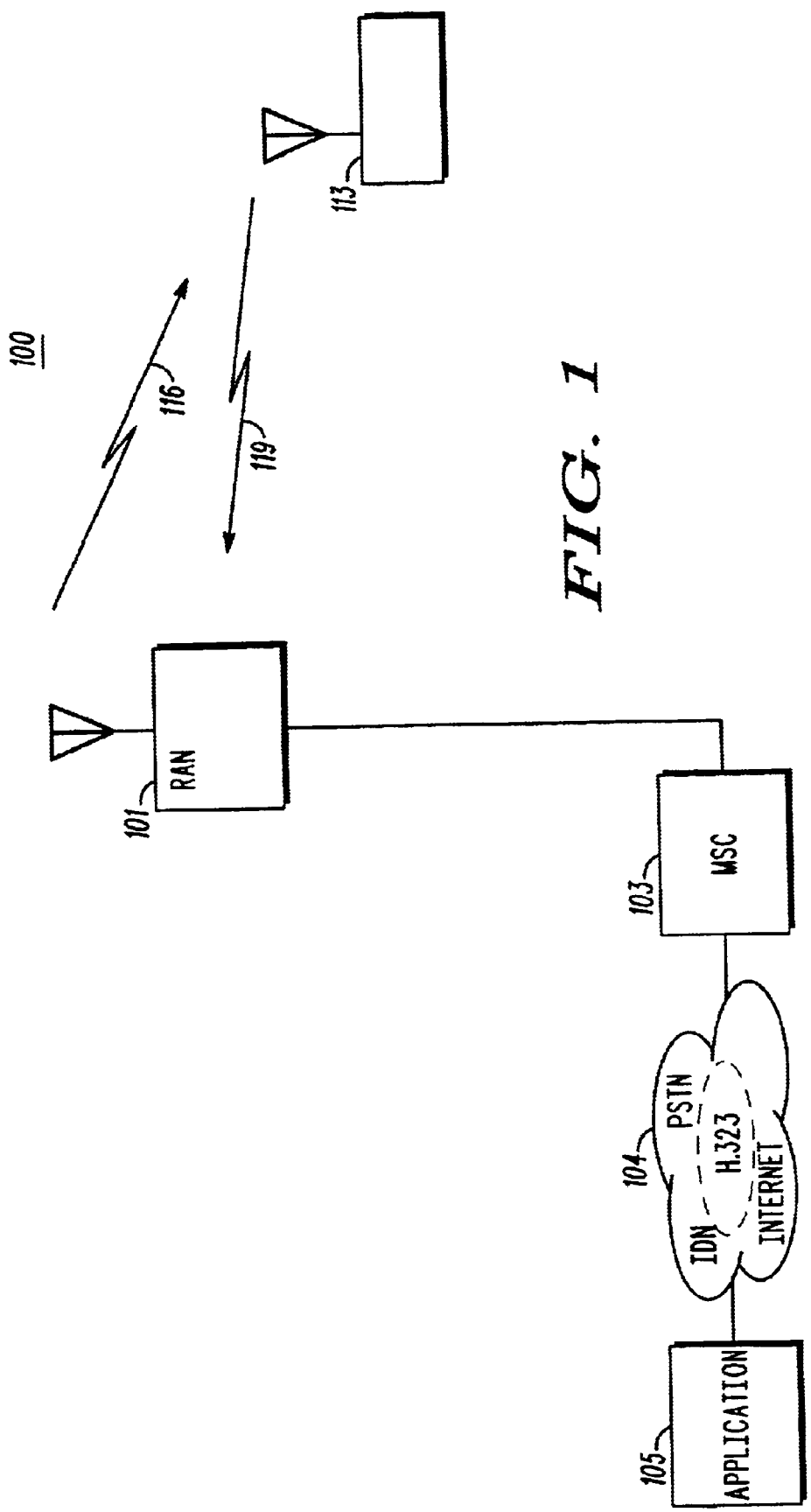
FIG. 1 is a block diagram of a communication system in accordance with the preferred embodiment of the present invention.

Turning now to the drawings, wherein like numerals designate like components, FIG. 1 is a block diagram of communication system 100 in accordance with the preferred embodiment of the present invention. As shown, communication system 100 comprises remote unit (or user) 113, Radio Access Networks (RAN) 101, Packet Data Network (PDN) 104, and application 105. In the preferred embodiment of the present invention, RAN 101 utilizes a WCDMA system protocol as described in the $3^{rd}$ Generation Partnership Project (3GPP) technical specifications, however, in alternate embodiments RAN 101 may utilize other cellular communication system protocols such as, but not limited to, the next generation CDMA architecture as described in the next generation CDMA architecture as described in the cdma2000 International Telecommunication Union-Radiocommunication (ITU-R) Radio Transmission Technology (RTT) Candidate Submission document, or the next generation Global System for Mobile Communications (GSM) protocol, the CDMA system protocol as described in "Personal Station-Base Station Compatibility Requirements for 1.8 to 2.0 GHz Code Division Multiple Access (CDMA) Personal Communication Systems" (American National Standards Institute (ANSI) J-STD-008), or the European Telecommunications Standards Institute (ETSI) Wideband CDMA (W-CDMA) protocol.

Although not shown, RAN 101 includes a number of network elements such as base stations, centralized base station controllers, and mobile switching centers. In the preferred embodiment of the present invention, all network elements are available from Motorola, Inc. (Motorola Inc. is located at 1301 East Algonquin Road, Schaumburg, Ill. 60196). It is contemplated that all elements within communication system 100 are configured in well known manners with processors, memories, instruction sets, and the like, which function in any suitable manner to perform the function set forth herein.

As shown, remote unit 113 is communicating with RAN 101 via uplink communication signals 119 and RAN 101 is communicating with remote unit 113 via downlink communication signals 116. RAN 101 is suitably coupled to PDN 104, and ultimately to application 105. In the preferred embodiment of the present invention PDN 104 is a service network, such as, but not limited to, a Public Switched Telephone Network (PSTN), an Integrated Switched Digital Network (ISDN), an International Telecommunication's Union (ITU) H.323 network, a Wide Area Network (WAN), a Local Area Network (LAN), or an internet network. Finally, application 105 is preferably an application running on a Personal Computer workstation, minicomputer, or large computing system that provides data to remote unit 113 via RAN 101. Typical examples of such applications include stock updates, weather forecasts, news updates, requested file transfers, . . . , etc.

In order to control data transmission within communication system 100 a radio link protocol (RLP) is utilized as described in 3GPP RLC protocol technical specification 25.322 (TS 25.322). As described in TS 25.322, messaging is used to convey status information (via uplink communication signal 119) from remote unit 113 to RAN 101 via the RLC acknowledged mode (RLC-AM) configuration. More particularly, when polled, remote unit 113 provides RAN 101 with a radio link control message. The RLC control message contains information such as the current window size, the number and identification of frames received in error, acknowledgment, move receive window indication, no more data indication, . . . etc. In the preferred embodiment of the present invention the polling frequency is based on a channel condition metric. More particularly, active RLC-AM timers that control the transmission of status information over the air interface are adjusted based on a BER of the radio channel such that as the BER of the radio channel decreases less control information is transmitted. Similarly as BER increases the timer values will change such that more control information is transmitted.

In response to the received RLC-AM control message, RAN 101 will update certain timers, and buffers and cause either a retransmission or discard of a frame. Depending on the RAN 101 control messaged received, RAN 101 may generate additional control message to be transmitted to remote unit 113 using down link communication link 116 such as a move window forward command, etc.

The advantage of limiting RLC-AM control messaging under good channel environments is that very little (or no) control information is broadcast during these situations, decreasing system interference. In a radio environment where bandwidth is limited, reducing the amount of control information transmitted over the air interface leads to better channel conditions and greater capacity. During time periods when the channel condition degrades, control information will be broadcast more frequently to avoid repercussion to higher layer protocols, deadlock, and avoid resetting a connection.

Figure 2:
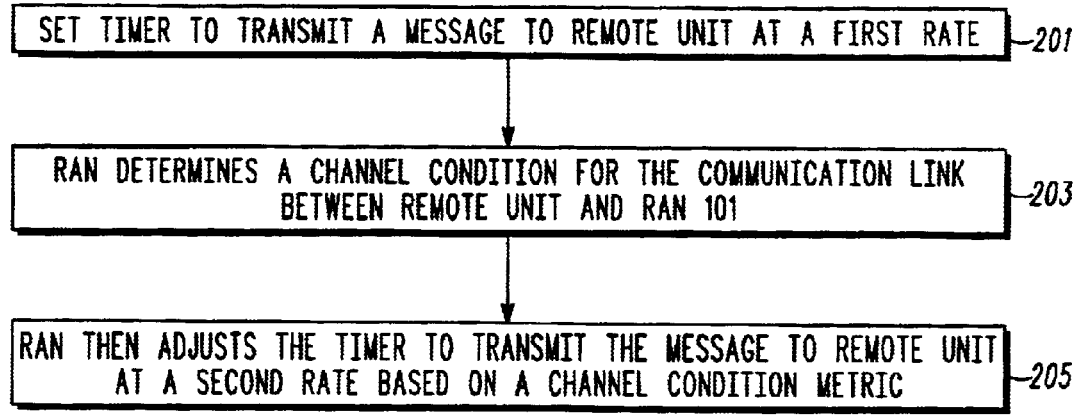
FIG. 2 is a flow chart showing operation of the communication system in accordance with the preferred embodiment of the present invention.

FIG. 2 is a flow chart showing operation of the communication system in accordance with the preferred embodiment of the present invention. The logic flow begins at step 201 where a timer is set to transmit a message to remote unit 113 at a first rate. In the preferred embodiment of the present invention the message comprises a polling message as described in TS 25.322, however in alternate embodiments of the present invention the message can comprise other forms of messaging such as periodic or non-periodic update (control) information without the use of polling. At step 203 RAN 101 determines a channel condition for the communication link between remote unit 113 and RAN 101. In particular, RAN 101 analyzes uplink communication signal 119 to determine a BER for uplink communication path 119. At step 205 RAN 101 then adjusts the timer to transmit the message to remote unit 113 at a second rate. As described above, the rate is based on a channel condition metric. More particularly, as the BER of the radio channel decreases, less control information is transmitted. Similarly as BER increases the timer values will change such that more control information is transmitted.

Figure 3:
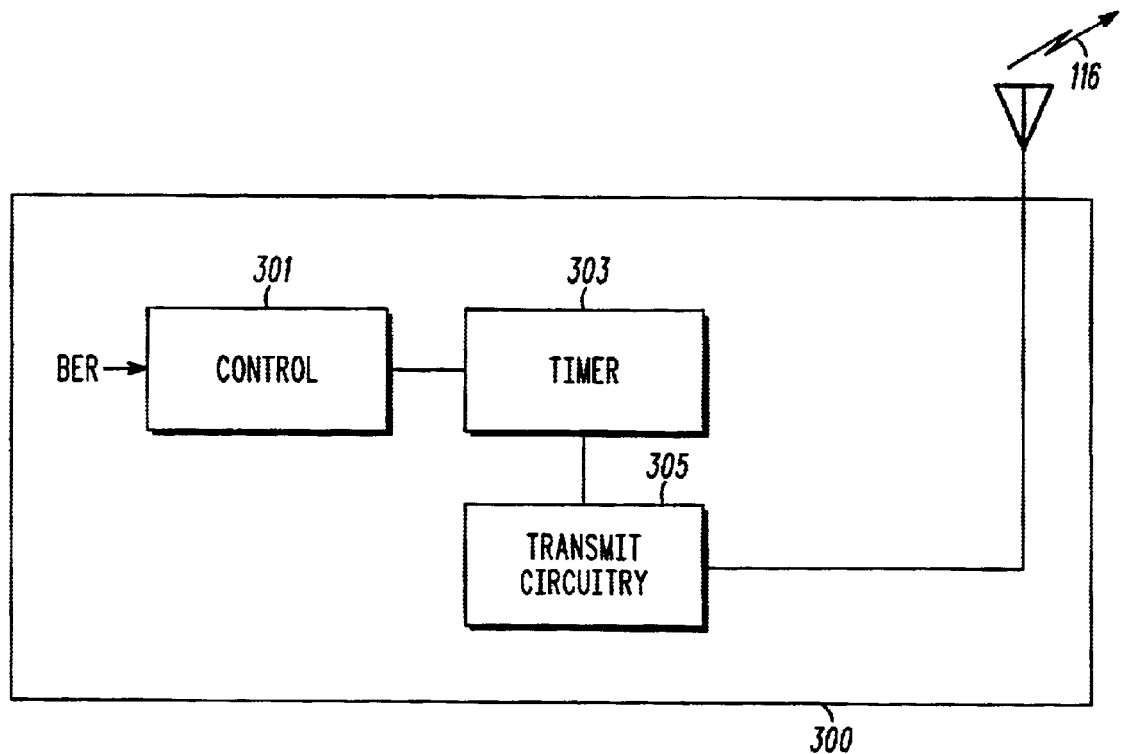
FIG. 3 is a block diagram of a base station in accordance with the preferred embodiment of the present invention.

FIG. 3 is a block diagram of base station 300 in accordance with the preferred embodiment of the present invention. As shown, base station 300 comprises control circuitry 301, timer 303, and transmit circuitry 305. In the preferred embodiment of the present invention control circuitry 301 preferably comprises a memory unit, logic circuitry, and microprocessor, while transmit circuitry 305 is standard WCDMA channel circuitry as described in 3GPP TS 25.211.

Figure 4:
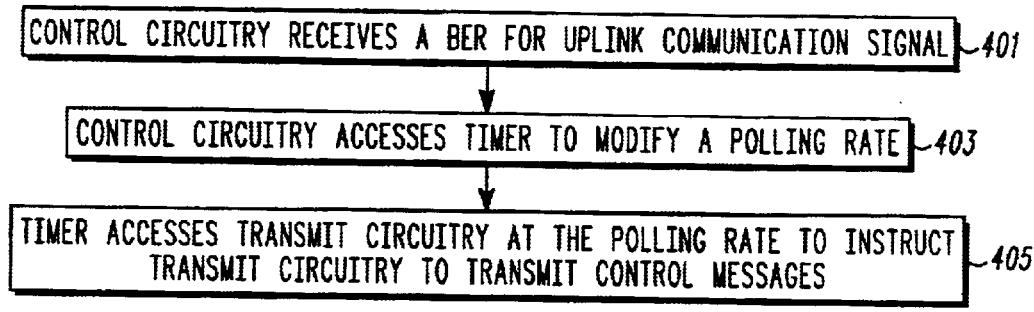
FIG. 4 is a flow chart showing operation of the base station of FIG. 3 in accordance with the preferred embodiment of the present invention.

Operation of base station 300 in accordance with the preferred embodiment of the present invention occurs as follows: Timer 303 periodically instructs transmit circuitry 305 to transmit messaging to remote unit 113. In particular, timer 303 commands circuitry 305 to send a polling message to remote unit at a first rate. As described in TS 25.322 section 9.2.2.4, the polling message comprises a polling bit that is used to request an RLC-AM control message from remote unit 113. Control unit 301 constantly monitors BER and adjusts timer 303 accordingly. In particular control unit 301 instructs timer 303 to adjust the polling rate based on the BER. As BER increases the timer values will change such that more control information is transmitted. In the preferred embodiment of the present invention, under good channel conditions, remote unit 113 is polled for an RLC-AM control message every second, while under poor BER conditions (e.g., 1% BER) remote unit 113 is polled for an RLC-AM control message every 50 millisecond FIG. 4 is a flow chart showing operation of base station 300 of FIG. 3 in accordance with the preferred embodiment of the present invention. The logic flow begins at step 401 where control circuitry 301 receives a BER for uplink communication signal 119. At step 403, control circuitry 301 accesses timer 303 to modify a polling rate. More particularly, as BER increases, control circuitry 301 will instruct timer 303 to increase the polling rate. At step 405 timer 303 accesses transmit circuitry 305 at the polling rate to instruct transmit circuitry to poll remote unit 113.

As discussed above, the advantage of limiting messaging under good channel environments is that very little (or no) control information is broadcast. In a radio environment where bandwidth is limited, reducing the amount of control information transmitted over the air interface leads to better channel conditions and greater capacity. During time periods when the channel condition degrades, control information will be broadcast more frequently to avoid repercussion to higher layer protocols, deadlock, and avoid resetting a connection.

Figure 5:
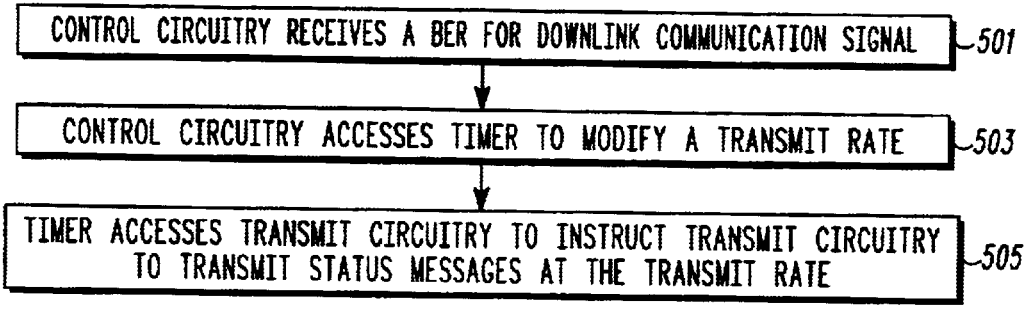
FIG. 5 is a flow chart showing operation of a remote unit in accordance with an alternate embodiment of the present invention.
Figure 6:
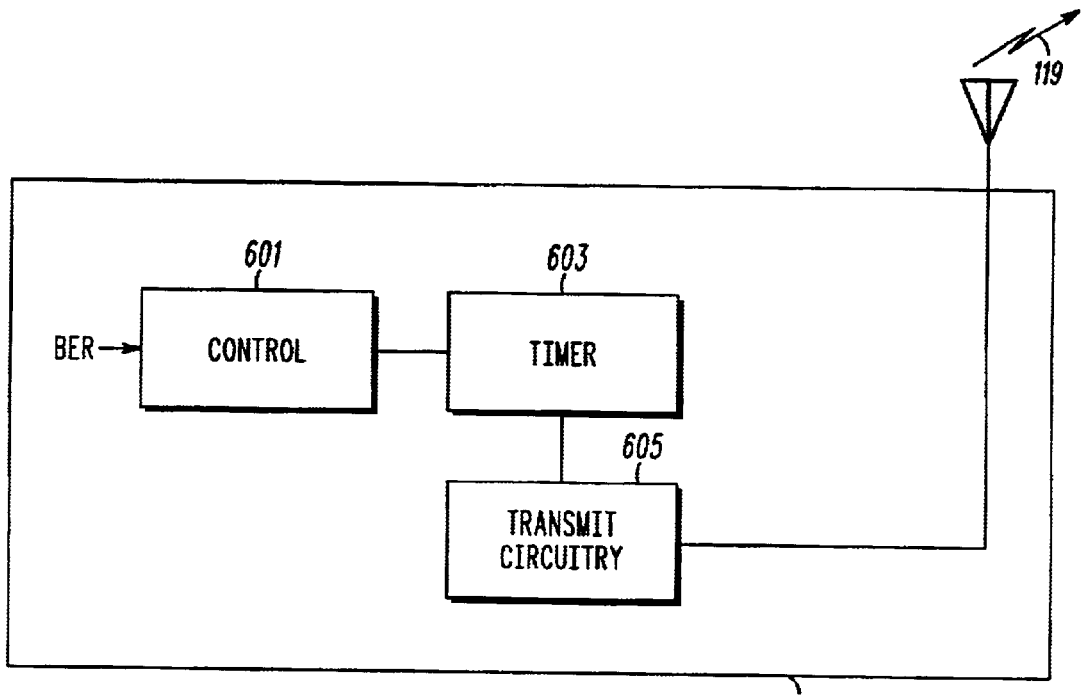
FIG. 6 is a block diagram of a remote unit in accordance with the alternate embodiment of the present invention.

FIG. 5 is a flow chart showing operation of remote unit 113 in accordance with an alternate embodiment of the present invention. In the alternate embodiment of the present invention, remote unit 113 periodically send status updates (e.g., RLC-AM control messages) to RAN 101 without polling. In the alternate embodiment remote unit 113 is configured as shown in FIG. 6, where status information is transmitted via uplink communication signal 119.

The logic flow begins at step 501 where control circuitry 601 receives a BER for downlink communication signal 116. At step 503, control circuitry 601 accesses timer 603 to modify a transmit rate. More particularly, as BER increases, control circuitry 501 will instruct timer 603 to increase the transmit rate. At step 505 timer 603 accesses transmit circuitry 605 at the transmit rate to instruct transmit circuitry to transmit status information. In response, remote unit 113 will periodically send status updates to RAN at the transmit rate.

Figure 7:
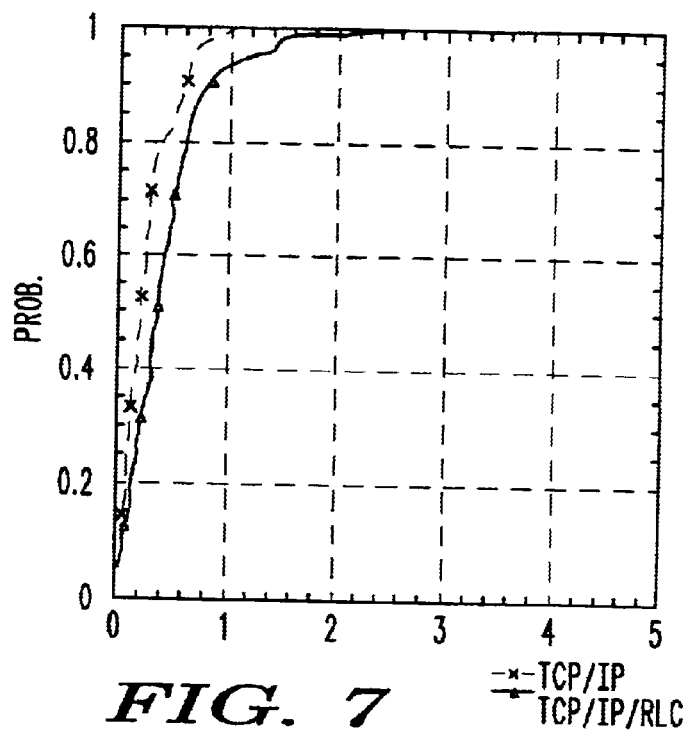
FIG. 7 through FIG. 9 illustrate the benefits of data transmission in accordance with the preferred embodiment of the present invention.
Figure 8:
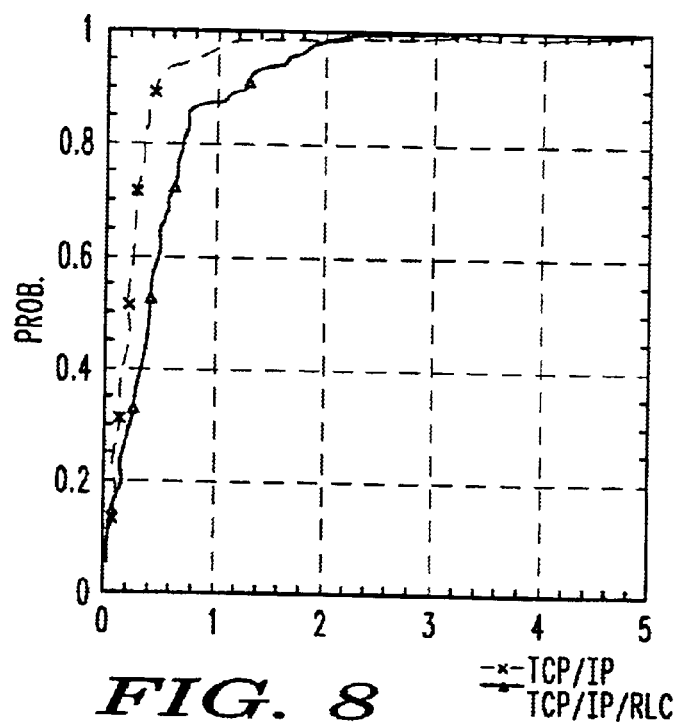
Figure 9:
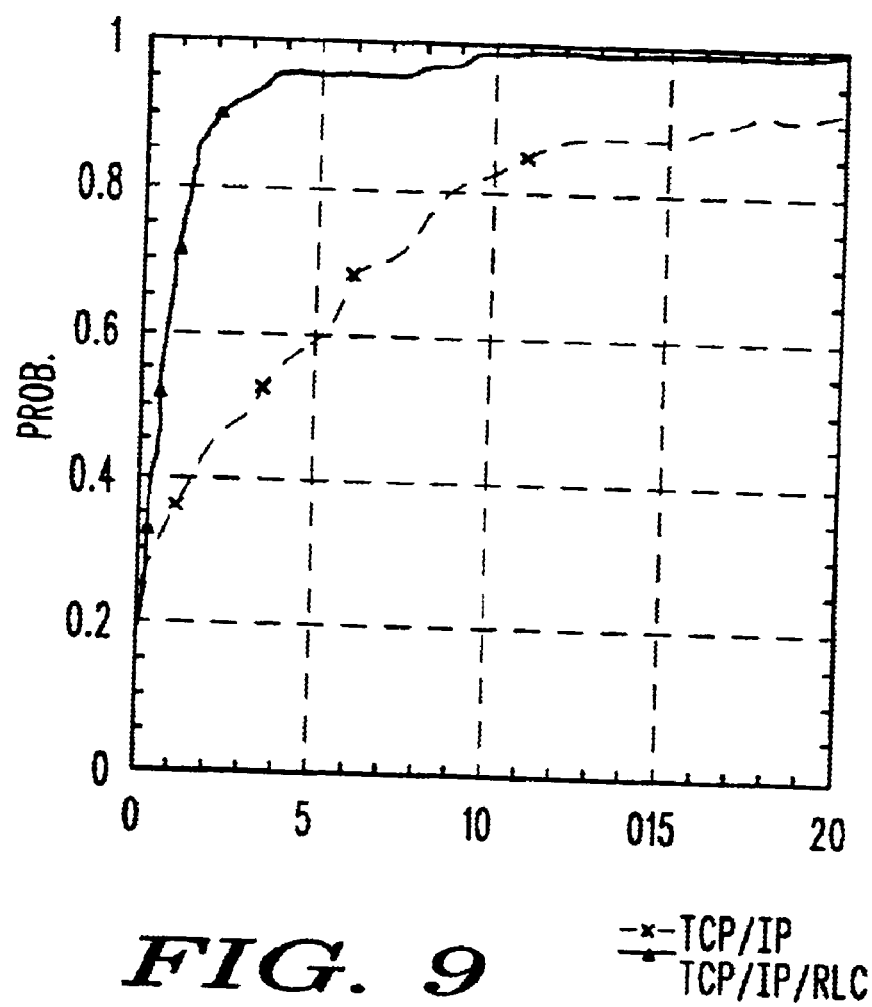

FIG. 7 through FIG. 9 illustrate the benefits of data transmission in accordance with the preferred and alternate embodiments of the present invention. In particular, these figures show simulation results for RLC-AM transmissions at 640 KBPS at various bit error rates (BER). The figures are based on a simulation model using web browsing over TCP/IP with and without RLC. Notice that RLC-AM has its greatest effect under high BER conditions. Because of this, at low BER environments the amount of control information is reduced such that the curve with RLC shifts to the right thus approaching the ideal transmission scenario (without RLC).

While the invention has been particularly shown and described with reference to particular embodiments, it will be understood by those skilled in the art that various changes in form and details may be made therein without departing from the spirit and scope of the invention. For example, although in the preferred embodiment of the present invention BER is utilized as a condition to adjust polling frequency, one of ordinary skill in the art will recognize that any channel condition metric (e.g., Frame error rate (FER), Signal to Noise Ratio (S/N), . . . , etc.) may be employed as well. It is intended that such changes come within the scope of the following claims.

What is claimed is:

1. A method for reducing interference within a communication system, the method comprising the steps of:
   polling a remote unit for status information at a first rate;
   determining a channel condition metric for an uplink channel; and
   polling the remote unit for status information at a second rate, wherein the second rate is based on the channel condition metric for the uplink channel.

2. The method of claim 1 wherein the step of determining the channel condition metric comprises determining the channel condition metric from the group consisting of BER, Frame Error Rate (FER), and Signal to Noise Ratio (S/N).

3. The method of claim 1 wherein the step of polling the remote unit for status information comprises the step of polling the remote unit for a radio link control acknowledgment mode (RLC-AM) control message.

4. The method of claim 1 further comprising the step of receiving status information from the remote unit at the second rate.

5. A method for reducing interference within a communication system, the method comprising the steps of:
   transmitting data to a remote unit via a downlink channel;
   polling the remote unit for status information regarding the transmitted data, wherein the step of polling takes place at a first polling rate;
   determining a channel condition metric for an uplink channel; and
   polling the remote unit for the status information at a second rate, wherein the second rate is based on the channel condition metric for the uplink channel.

6. The method of claim 5 wherein the step of determining the channel condition metric comprises determining a channel condition metric from the group consisting of BER, Frame Error Rate (FER), and Signal to Noise Ratio (S/N).

7. The method of claim 5 wherein the step of polling the remote unit for status information comprises the step of polling the remote unit for a radio link control acknowledgment mode (RLC-AM) control message.

8. The method of claim 5 further comprising the step of receiving status information from the remote unit at the second rate.

9. The method of claim 5 wherein the step of polling the remote unit at the second rate comprises the step of polling the remote unit at a higher rate when the BER is high.

10. A method comprising:
    sending status information to a radio access network (RAN) at a first rate;
    determining a channel condition of a downlink communication channel; and
    sending status information to the RAN at a second rate based on the channel condition.

11. The method of claim 10 wherein the step of sending status information to the RAN comprises the step of sending a radio link control acknowledgment mode (RLC-AM) control message to the RAN.

12. The method of claim 10 wherein the step of determining the channel condition metric comprises determining the channel condition metric from the group consisting of BER, Frame Error Rate (FER), and Signal to Noise Ratio (S/N).

13. An apparatus comprising:
    a control unit having a channel condition metric as an input and outputting a polling rate;
    a timer having the polling rate as an input and outputting a command at the polling rate; and
    transmission circuitry having the command as an input and outputting a polling message to a remote unit at the polling rate.

14. The apparatus of claim 13 wherein the channel condition metric is a metric from the group consisting of BER, Frame Error Rate (FER), and Signal to Noise Ratio (S/N).

15. The apparatus of claim 13 wherein the polling message is a message instructing the remote unit to transmit a radio link control acknowledgment mode (RLC-AM) control message.

16. The apparatus of claim 13 wherein the channel condition metric is a channel condition metric of an uplink channel.

17. An apparatus comprising:
    a control unit having a channel condition metric as an input and outputting a transmit rate;
    a timer having the transmit rate as an input and outputting a command at the transmit rate; and
    transmission circuitry having the command as an input and outputting a status message to a radio access network (RAN) at the transmit rate.

18. The apparatus of claim 17 wherein the channel condition metric is a metric from the group consisting of BER, Frame Error Rate (FER), and Signal to Noise Ratio (S/N).

19. The apparatus of claim 17 wherein the status message is a radio link control acknowledgment mode (RLC-AM) control message.

20. The apparatus of claim 17 wherein the channel condition metric is a channel condition metric for a downlink channel.

* * * * *